Aug. 1, 1961   R. M. HAINES   2,994,594
APPARATUS FOR PREPARING AND REACTING DISPERSIONS
Filed Oct. 9, 1959
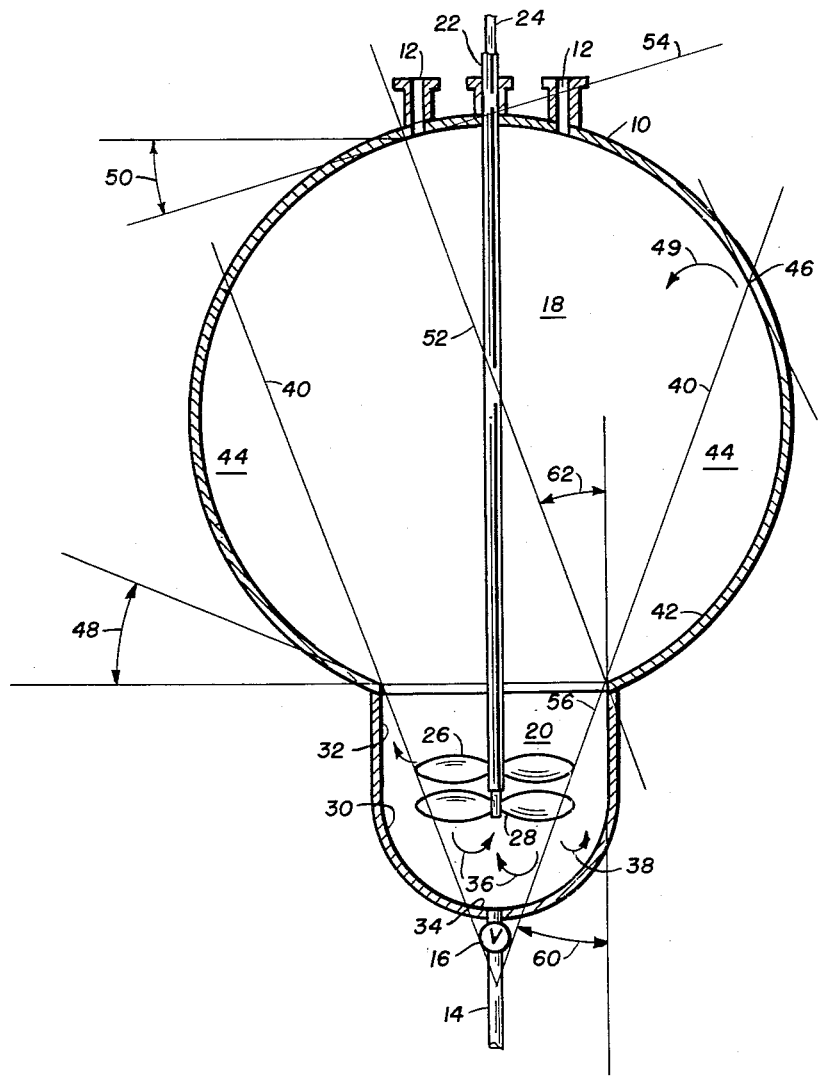
INVENTOR.
ROBERT M. HAINES
BY Edward H. Lang
ATTORNEY

United States Patent Office 2,994,594
Patented Aug. 1, 1961

2,994,594
APPARATUS FOR PREPARING AND REACTING DISPERSIONS
Robert M. Haines, Crystal Lake, Ill., assignor to The Pure Oil Company, Chicago, Ill., a corporation of Ohio
Filed Oct. 9, 1959, Ser. No. 845,372
4 Claims. (Cl. 23—285)

This invention is directed to an apparatus in which dispersions, and more particularly dispersions of alkali metals in a liquid, can be prepared and reacted with subsequently-added liquids without requiring transfer of the dispersion to a larger vessel.

The use of finely-divided dispersions of elemental alkali metals, and especially of sodium, in certain chemical reactions has become widespread. The metal is disposed in a liquid by melting it in the liquid and agitating the mixture violently, as by means of a high-speed mixer. In order to achieve the requisite violence of mixing, it is necessary to employ high-speed, preferably counter-rotating, propeller blades, and to mix the materials in a vessel having a diameter only slightly greater than that of the blades. When a vessel of such small diameter is used, it is necessary to transfer the dispersion to a larger vessel before combining with other reactants. This method is cumbersome, costly, and not well suited to commercial operations. Furthermore, it is difficult or impossible to prevent contact between the dispersion and air, and some of the metal of necessity becomes inactivated upon contact with air.

The prior art teaches the use of mixing vessels comprising upper and lower chambers, the lower chamber having a volume substantially less than that of the upper chamber, and containing a mixer blade. Using such devices, it is possible to mix a relatively small volume of a first liquid and later blend therewith a greater volume of a second liquid without removing either liquid from the vessel until the whole is thoroughly mixed. Such devices have been found unsatisfactory for the production of metallic dispersions, especially where the volume of the larger upper chamber of the vessel is greater than about five times the volume of the lower portion of the vessel. The violent mixing required to produce satisfactory metallic dispersions spatters the metal and liquid throughout the upper portion of the vessel. Since the surface area of the whole vessel is necessarily large, as compared to the quantity of material comprising the dispersion, material thrown upward by the violent mixing in the lower chamber coats the walls of the upper chamber. Return of this material by force of gravity is substantially prevented by the continuing upward splatter from the lower chamber. The result is that the lower chamber is largely emptied of material to be mixed and the production of a satisfactory dispersion is thereby prevented.

It is an object of this invention to provide an improved, dual-chamber mixing vessel of such shape that the downward flow of spattered material produced by force of gravity is not substantially impeded or prevented.

It is another object of this invention to provide a mixing vessel for use with a high-speed mixer for the preparation of a dispersion of an alkali metal in a liquid, and for the subsequent mixing and reaction of the dispersion with a second liquid having a volume greater than about five times the volume of the dispersion.

This invention is best described with reference to the drawing, which depicts the critical shape and arrangement of the mixing vessel of this invention. Shell 10 of the mixer of this invention may be fabricated of any suitable material, such as glass or stainless steel. Surrounding the vessel shell is a suitable heating means, not shown, such as a steam jacket. The vessel is provided with fluid inlets 12, and fluid outlet 14, which is controlled by valve 16. The fluid inlets communicate with the upper portion of the mixing vessel, and the fluid outlet preferably communicates with the lowest extremity of the vessel.

The vessel comprises an upper chamber 18 and a lower chamber 20. The relative volumes of the upper and lower chambers are determined by the volume of the dispersion to be produced, and by the volume of the material with which the dispersion is to be mixed or reacted. Vertical, concentric shafts 22 and 24 are supported to extend into the mixing vessel, and support propellers 26 and 28, respectively. The two propellers disposed within lower chamber 20 are coaxial and adapted to rotate in opposite directions to produce a downward flow in lower chamber 20. Shafts 22 and 24 may enter the vessel either from the top or the bottom, but must be substantially vertical and adapted to support propeller blades 26 and 28 for rotation in a horizontal plane.

The shape of the interior surface of vessel shell 10 is critical, as it is this shape which, together with the location and size of propeller 26, determines whether or not satisfactory flow of spattered dispersion material from the walls of the upper chamber back to the lower chamber will be provided. The interior surface 30 of lower chamber 20 is cup-shaped and circular in horizontal cross-section. The lateral surface 32 of the lower chamber may be vertical or inclined inwardly at an angle not in excess of about 20°. The bottom surface 34 of chamber 20 is preferably hemispherical, but may be formed in other shapes, such as that of an inverted, truncated cone, provided, that the center portion of the bottom surface surrounding outlet 14 is at the lowest point in the vessel. Bottom surface 34 of the lower chamber is preferably curved concave upward, but may in the alternative be formed from a non-curving surface, provided the surface is inclined outwardly from the bottom-center of the lower chamber. Such a shape is necessary to provide a satisfactory flow of fluid in the lower chamber under high-speed mixing. The liquid being mixed is forced downward by propellers 26 and 28, the maximum downward thrust being applied by the faster-moving propeller tips. The preferred hemispherical shape of the bottom portion of the cup-shaped lower chamber produces a downward-and inward-circulating flow of the liquid to be mixed, as illustrated by arrows 36. A flat bottom does not tend to produce the desired circulation, and a bottom which is torus-shaped or inclined inwardly tends to produce an outwardly curving flow, as is illustrated by arrow 38. Such an outwardly-curving flow permits the liquid to flow upward along lateral surface 32 of the lower chamber, by-pass the propellers, and escape upward into upper chamber 18. Inwardly-curving flow, as depicted by arrows 36 and produced by the preferred hemispherical shape, results in the return of liquid into the center of the propeller blades.

Satisfactory operation can be obtained using a single propeller blade 26, without the second coaxial propeller, 28. However, the use of a single propeller imparts a swirling or spiral motion to the fluid being mixed. This swirling motion produces a centrifugal force which tends to force the fluid toward the lateral surface of the lower chamber, and to some extent interferes with the desired, inwardly-curving flow pattern. For this reason, it is preferred to use coaxially-mounted, counter-rotating propellers which substantially eliminate the swirling motion. I have found that superior mixing action is obtained through the use of counter-rotating propellers.

Also, I have found that high-speed propellers, besides imparting a downward motion to the liquid, also tend to throw some liquid radially outward from the propeller tips and against surface 32 of the lower chamber. It is therefore necessary that surface 32 be either vertical, that is, cylindrical, or inclined inwardly. This is required because an outwardly-inclining surface will urge the outwardly-flung liquid to ride upward along the incline and out of lower chamber 20. To insure adequate mixing, propeller 26 is preferably disposed at a height not more than ⅔ of the distance from the bottom of the lower chamber to the intersection of the lower chamber with the upper chamber.

The lower chamber of the mixing vessel as thus defined provides adequate mixing with minimum spattering of fluid into the upper chamber. It is further necessary that upper chamber 18 be designed to provide rapid return of liquid spattered against the walls thereof to lower chamber 20. The retention of liquid on the surface of the upper chamber is reduced by providing a chamber of minimum surface area consistent with sufficient volumetric capacity. A spherical upper chamber is therefore preferred, but other shapes of circular horizontal cross-section may also be used. I have found that the upward spatter of fluid from the lower chamber substantially impedes and retards the downward flow of fluid along the surface of the upper chamber. It is therefore necessary to provide a path of downward flow along the surface of the upper chamber to prevent the accumulation and retention of spattered fluid on the surfaces of the upper chamber. With this concept in mind, the critical features of the shape of the upper chamber of the mixing vessel of this invention will be described.

Surface 40 is the surface of an imaginary right cone having an axis coinciding with the axis of shaft 22 and a surface defined as passing through the circle of rotation of the tips of propeller 26, and also passing through the circle of intersection of surface 32 of the lower chamber with lower surface 42 of the upper chamber. It is evident that the shape of this cone is determined by the diameter and vertical orientation of propeller 26, as well as by the shape of the mixing vessel at the intersection of the upper and lower chambers thereof. I have found that zone 44 of upper chamber 18, which zone is defined as the space lying within the volume enclosed by lower surface 42 of the upper chamber, but lying without cone surface 40, is substantially free of upwardly moving fluid spray. The portion of the surface of the upper chamber surrounding zone 44, that is, that part of the surface of the upper chamber lying above the intersection of the upper and lower chambers, but lying below the intersection of imaginary cone surface 40 with the surface of the upper chamber at point 46, provides an adequate path for the flow of liquid downward to the lower chamber. It is necessary that this path lay outside of the area encompassed by imaginary cone 40, and be inclined at a minimum angle 48 which is at least 5°, and preferably greater than 15°, to provide an adequate flow rate under the force of gravity.

It is necessary that the surface of the upper chamber at point 46, the point of intersection of imaginary cone surface 40 with the surface of the upper-chamber wall, be inclined inwardly. Spattered material striking the inwardly-inclined wall above point 46 is prevented from flowing downward along the wall surface by the continuously-impinging spray of liquid. If the surface of the upper chamber above point 46 is inclined inwardly at an angle in excess of 5°, then the material which would otherwise collect along the upper surface of the upper vessel falls inwardly in the direction of arrow 49, and returns to the lower chamber. If the upper vessel surface at a point above point 46 is inclined outwardly, contrary to the teachings of this specification, the downward flow of spattered material is prevented by the continuously-impinging upward spray of liquid, and since the liquid is unable to fall inwardly and return to the lower chamber, it collects and remains in large amounts along this outwardly-inclined chamber surface.

I have found further that adequate return of spattered liquid to the lower chamber is achieved only when angle 50, the angle between tangent line 54 and the horizontal, is at least 10°. Reflectance line 52 is the line corresponding to incidence line 56, reflectance being considered as occurring from surface 32. Incidence line 56 lies in surface 40 of the imaginary cone before-described. Incidence line 56, reflectance line 52, and tangent line 54 are all taken as being coplanar with the axis of shaft 22. Hence, angle 60 of incidence between line 56 and surface 32 equals angle of reflectance 62 between reflectance line 52 and the imaginary extension of surface 32 in an upward direction. Tangent line 54 is tangent to surface 42 of the upper chamber at the point of intersection of reflectance line 52 with said surface. Hence, the upper chamber surface 42 makes an angle of at least 10 degrees with the horizontal at and below the point of intersection with line 52. Angle 50 should be at least 10° because material traveling along reflectance line 52 is essentially spent in velocity after encountering surface 32, and represents only a small amount of material flowing by the force of gravity down surface 40 to join the material represented by arrow 48. If angle 50 is less than 10°, gravitational force is not sufficient to return the material to the lower mixing chamber. All of the critical limitations set out above must be met in order to provide a satisfactory mixing vessel for a high-speed mixer to produce dispersions of alkali metals in a liquid, and then for mixing or reacting the dispersion with a quantity of liquid having a volume of about five times or more the volume of the dispersion. It is seen that all of the critical limitations can be met only by proper selection of the diameter and location of propeller 26, as well as of the shape of the upper and lower chambers of the vessel. When counter-rotating propellers are used, as is preferred, the second propeller 28 should be disposed coaxially with and just below critically-located propeller 26. Propellers having a blade shape and pitch generally suitable for high-speed mixing have been found satisfactory. It is evident that propeller shafts 22 and 24 may enter the mixing vessel from either the top or the bottom. Bearing supports may be provided as required.

While reasons and explanations have been set out for the various critical structural limitations necessary to the construction of a satisfactory mixer, the inventor does not intend to limit himself to any theory of operation. Mixers made in accordance with this specification have been found to function properly in practice, where mixers constructed otherwise have failed to operate as desired.

The embodiments of the invention in which an exclusive property or privilege is claimed are defined as follows:

1. A mixing vessel for producing dispersions of solids in liquids, and mixing the resulting dispersion with larger quantities of liquids, comprising a closed vessel having an upper chamber of circular horizontal cross-section and a cup-shaped lower chamber of circular horizontal cross-section communicating therewith, the ratio of the volume of said upper chamber to the volume of said lower chamber being in excess of about 5 to 1, shaft-means extending substantially vertically within said vessel and supporting a propeller within said lower chamber for horizontal rotation therein, the interior lateral surface of said lower chamber being concentric with said shaft-means and inclined inwardly at an angle of between about 0° and 20° from vertical, the bottom interior surface of the lower chamber being inclined outwardly from the center to the periphery thereof, the upper open extremity of said lower chamber intersecting the lowest extremity of said upper chamber to form a single vessel therewith, the interior surface of the upper chamber extending outwardly from the intersection of said chambers at an angle in excess of 5° with the horizontal; and the interior surface of said upper chamber and the location and diameter of said propeller being additionally characterized such that, considering the surface of an imaginary right circular cone having an axis coincident with the axis of said shaft and a surface passing through both the circle of rotation of the tips of said propeller and the circle of intersection of said upper and lower chambers, the surface of said cone intersects the surface of said upper chamber at a point at which said chamber surface inclines inwardly at an angle in excess of 5° from the vertical, the portion of the surface of said upper chamber defined as lying between the intersection of said upper and lower chambers and the intersection of the surface of said cone with the surface of said upper chamber lies outside of said cone, and a line of reflectance from the lateral surface of the lower chamber corresponding to a line of incidence lying in the surface of said cone, said lines of incidence and reflectance being coplanar with the axis of said shaft, intersects the surface of the upper chamber at a point at which the surface of the upper chamber inclines inwardly at an angle of at least 10° with the horizontal.

2. An apparatus according to claim 1 in which the surface of said upper chamber is spherical and the bottom surface of the lower chamber is hemispherical.

3. An apparatus according to claim 2 including a second propeller adapted for counter-rotation with said first propeller and supported below said first propeller coaxially therewith.

4. An apparatus according to claim 3 including inlet means at the top of said upper chamber and outlet means at the bottom-center of said lower chamber.

References Cited in the file of this patent
UNITED STATES PATENTS

| | | |
|---|---|---|
| 1,764,760 | Soule | June 17, 1930 |
| 2,209,287 | Simpson | July 23, 1940 |
| 2,660,518 | White | Nov. 24, 1953 |
| 2,774,653 | Cosmetto | Dec. 18, 1956 |